United States Patent [19]

Lee

[11] Patent Number: 5,844,967
[45] Date of Patent: Dec. 1, 1998

[54] METHOD FOR AUTOMATICALLY TRANSMITTING GREETING MESSAGE FROM RECEIVING TELEPHONE IN AN AUTOMATIC ANSWERING SYSTEM

[75] Inventor: Seung-Ku Lee, Gumi, Rep. of Korea

[73] Assignee: SamSung Electronics Co., Ltd., Kyungki-do, Rep. of Korea

[21] Appl. No.: 645,789

[22] Filed: May 13, 1996

[30] Foreign Application Priority Data

May 11, 1995 [KR] Rep. of Korea .................. 1995 11601

[51] Int. Cl.⁶ ....................................................... H04M 1/64
[52] U.S. Cl. ............................ 379/88; 379/67; 379/265
[58] Field of Search ................................ 379/67, 70, 88, 379/89, 265

[56] References Cited

U.S. PATENT DOCUMENTS

| | | |
|---|---|---|
| 4,697,282 | 9/1987 | Winter et al. .............................. 379/70 |
| 4,734,930 | 3/1988 | Quiros et al. .............................. 379/70 |
| 4,959,852 | 9/1990 | Kern et al. ................................. 379/70 |
| 5,029,198 | 7/1991 | Walpole et al. ............................ 379/88 |
| 5,063,589 | 11/1991 | Tsuhima ..................................... 379/82 |
| 5,189,692 | 2/1993 | Ferrara ....................................... 379/88 |
| 5,278,896 | 1/1994 | Sakata et al. .............................. 379/70 |
| 5,418,841 | 5/1995 | Haraguchi et al. ........................ 379/70 |
| 5,422,937 | 6/1995 | Ferrara ....................................... 379/88 |
| 5,539,818 | 7/1996 | Zdenek et al. ............................. 379/88 |
| 5,579,377 | 11/1996 | Rogers ....................................... 379/74 |

*Primary Examiner*—Daniel S. Hunter
*Attorney, Agent, or Firm*—Robert E. Bushnell, Esq.

[57] ABSTRACT

A method for automatically transmitting a greeting message in a telephone answering system contemplates the steps of: recording a greeting message in response to input of a recording key; detecting a hook-off state in response to an incoming call; determining whether a greeting message transmitting function is set by checking a logic state exhibited by a function flag, in response to detection of the hook-off state; and automatically transmitting the greeting message to a caller when the greeting message transmitting function is set.

23 Claims, 5 Drawing Sheets

5,844,967

METHOD FOR AUTOMATICALLY TRANSMITTING GREETING MESSAGE FROM RECEIVING TELEPHONE IN AN AUTOMATIC ANSWERING SYSTEM

CROSS-REFERENCE TO RELATED APPLICATIONS

This application makes reference to, incorporates the same herein, and claims all benefits accruing under 35 U.S.C. §119 arising from an application for Method For Automatically Transmitting Greeting Message From Receiving Telephone In An Auotmatic Answering System earlier filed in the Korean Industrial Property Office on 11 May 1995 and there duly assigned Ser. No. 11601/1995.

BACKGROUND OF THE INVENTION

The present invention relates to a method for automatically transmitting a greeting message in an automatic telephone answering system, and more particularly, to a method for automatically transmitting a previously recorded greeting message to a caller in response to a called party answering the telephone.

Typically, an automatic telephone answering system transmits an outgoing message during a user's (i.e., the called party) absence in response to an incoming call, and records an incoming message being left by a caller. To implement this function, the user must first record the outgoing message to be transmitted to a caller during his or her absence, and set the system to an absence mode. Thereafter, when the user's telephone rings, the answering system automatically answers the incoming call by playing the outgoing message, and records the incoming message left by the caller. Later, the user can playback and listen to the incoming message recorded by the caller during his or her absence.

With this type of telephone answering system, however, if the telephone rings when the system is not set to the absence mode, the user must answer the incoming call in the conventional manner by lifting the handset of the telephone and verbally greeting the caller. In these instances, the user typically greets the caller by saying "hello", and then identifies himself. Thereafter, a conversation between the user and the caller can ensue. When responding to incoming calls, however, it is often very inconvenient for the user to have to repetitively greet sucessive callers in this manner. This is especially true when the user is, for example, a receptionist or operator who receives a large number of incoming calls. Accordingly, there is a need for a method and system that relieves a user of this burden by enabling the user to transmit a greeting message to a caller.

One prior art reference that enables this function is U.S. Pat. No. 4,734,930 entitled Voice Recording Apparatus issued to Quiros et al. In Quiros et al. '930, a user first records a voice message to be transmitted to a caller. Then, when an incoming call is received, the user can transmit the recorded voice message to the caller by depressing an actuate switch. While this conventional type of art does enable the user to transmit a greeting message to a caller without actually speaking, I note that it inconveniently requires the user to depress the actuate switch each time the greeting message is transmitted.

SUMMARY OF THE INVENTION

Accordingly, it is an object of the present invention to provide an improved method for automatically transmitting a greeting message to a caller in response to a user answering an incoming call.

It is another object to provide a method for automatically transmitting a greeting message to a caller with a minimal number of user inputs.

It is still another object to provide a method for automatically transmitting a greeting message to a caller indicating the user's name and title.

It is yet another object to provide a telephone answering system that automatically transmits a pre-recorded greeting message to a caller in dependence upon a system operating function set by the user.

It is still yet another object to provide a telephone answering system that automatically transmits a pre-recorded greeting message to a caller, and also enables a user to transmit a greeting message to a caller by speaking.

To achieve these and other objects, the present invention provides a method for automatically transmitting a greeting message in a telephone answering system. The method contemplates the steps of: recording a greeting message in response to input of a recording key; detecting a hook-off state in response to an incoming call; determining whether a greeting message transmitting function is set by checking a logic state exhibited by a function flag, in response to detection of the hook-off state; and automatically transmitting said greeting message to a caller when the greeting message transmitting function is set.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
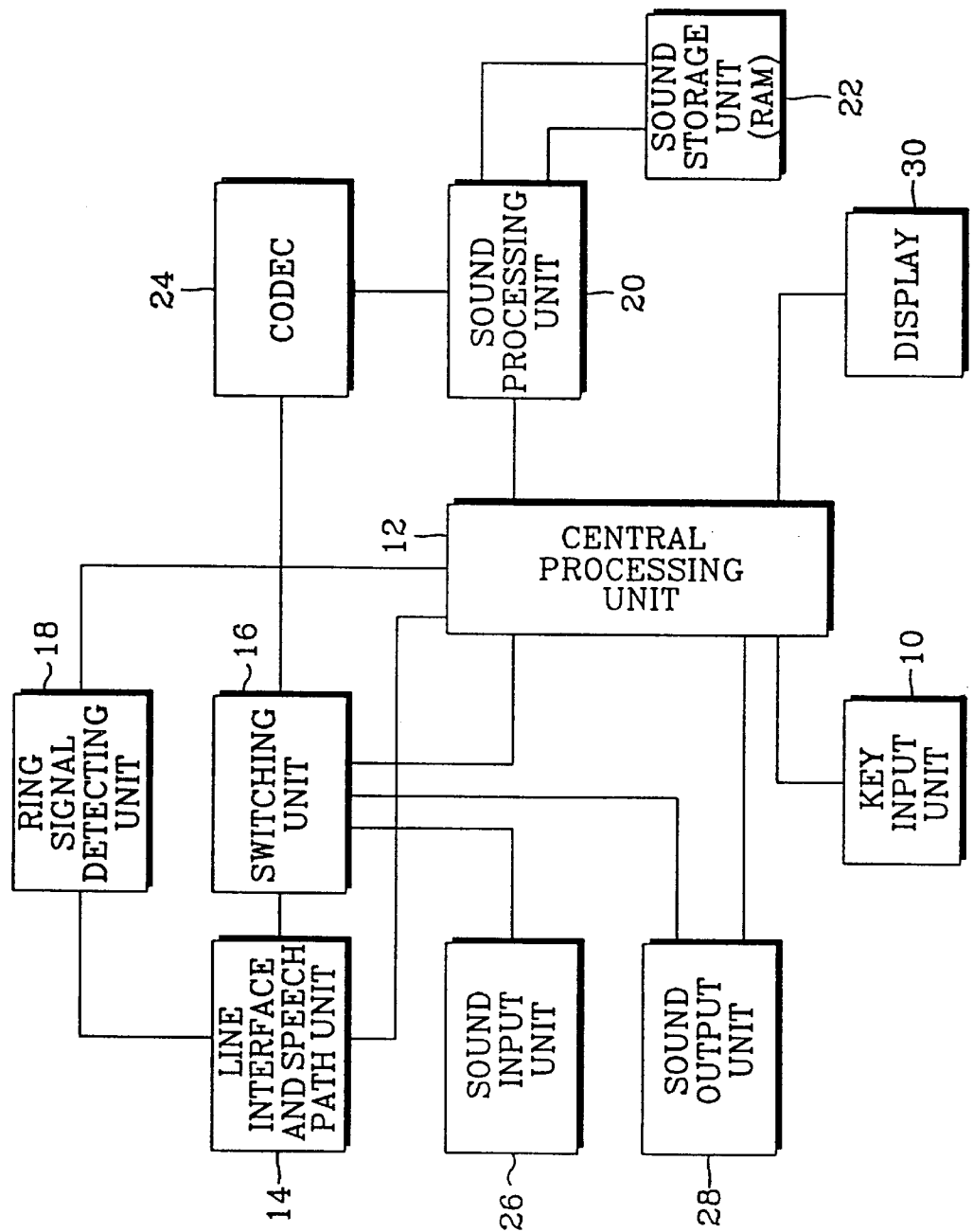
FIG. 1 is a block diagram of an automatic telephone answering system constructed according to the principles of the present invention.

Turning now to the drawings and referring to FIG. 1, a block diagram of an automatic telephone answering system constructed according to the principles of the present invention is shown. In FIG. 1, a key input unit 10 includes a plurality of input keys and generates commands and key data according to user inputs for controlling operation of the system. A central processing unit (CPU) 12 controls the general operation of the system for transmitting a greeting message after an incoming call is answered. A line interface and speech path unit 14 is connected to a public telephone network through a telephone line, interfaces a ring signal, a tone signal and a speech sound signal between the system and the public telephone network, and forms a speech path between the system and the public telephone network. A ring detecting unit 18 outputs a ring signal received through line interface and speech path unit 14 to central processing unit (CPU) 12. A sound input unit 26 comprised of a microphone or a telephone transmitter converts sound signals generated by a user into electrical signals. A sound output unit 28 comprised of a speaker or a telephone receiver converts the electrical signals into sound signals, and generates audible sounds. A codec 24 converts analog signals input through a switching unit 16 into digital signals, and outputs the digital signals to a sound processing unit 20. Codec 24 also converts digital signals into analog signals, and outputs the converted analog signals to switching unit 16. A sound storage unit 22 comprised of a random access memory (RAM) stores a guide message and a content message. Sound processing unit 20 combines the guide and greeting messages stored in sound storage unit 22 into sound signals for output under the control of central processing unit (CPU) 12. Switching unit 16, which is connected to sound input unit 26, sound output unit 28 and codec 24, performs a switching operation under the control of central processing unit (CPU) 12. A display unit 30 displays each operating state under the control of central processing unit (CPU) 12.

Figure 2:
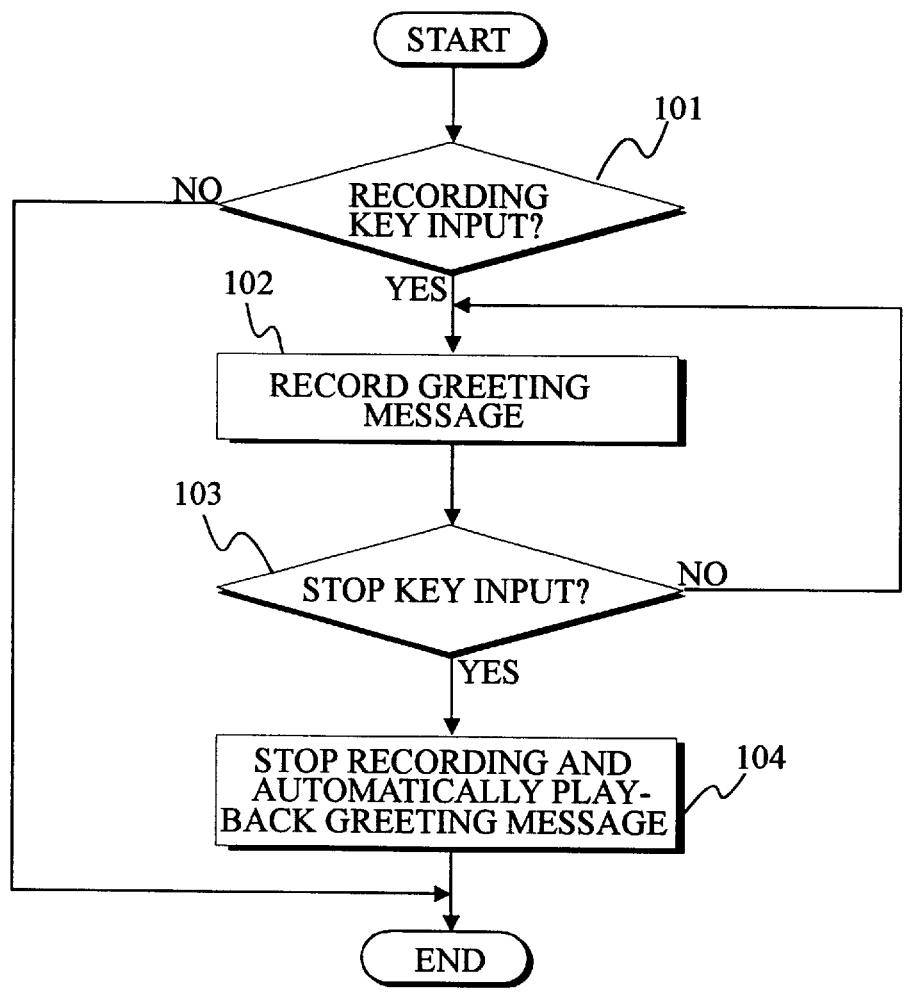
FIG. 2 is a flow chart illustrating the steps of registering a greeting message according to the principles of the present invention.

FIG. 2 is a flow chart illustrating the steps of registering a greeting message according to the principles of the present invention. Briefly, the method of FIG. 2 includes the steps of: recording a greeting message provided from a user in response to input of a recording key, and automatically playing back the recorded greeting message in response to input of a stop key.

Figure 3:
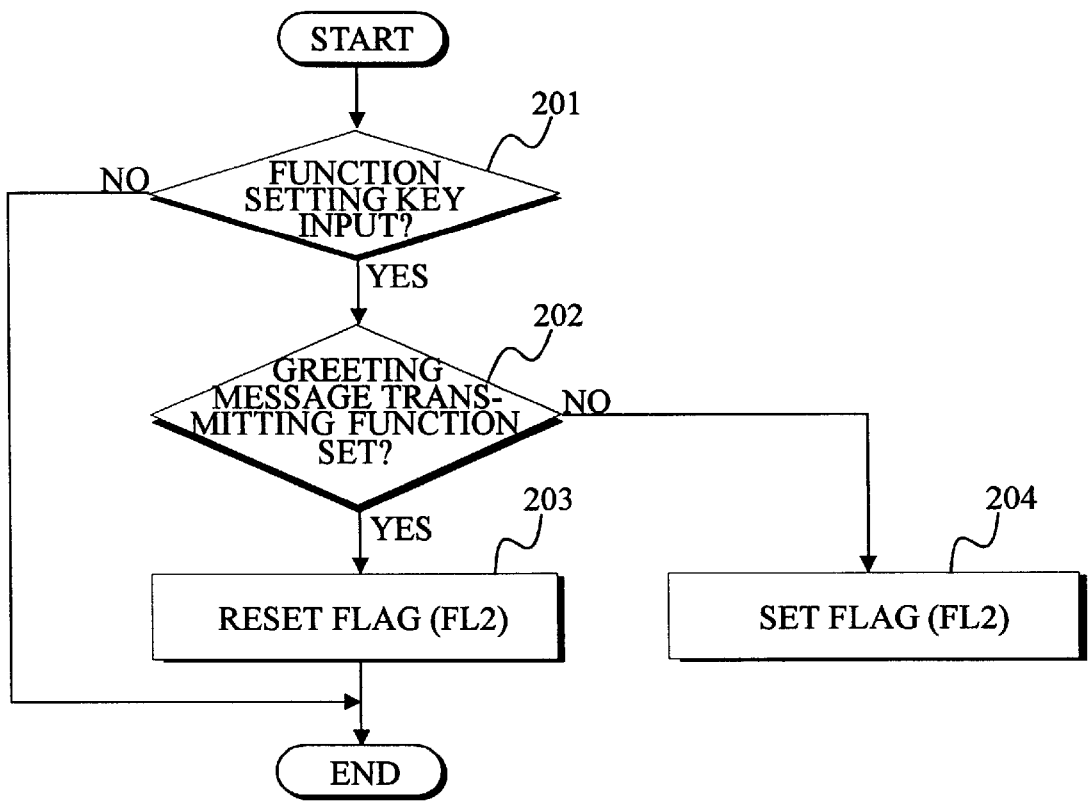
FIG. 3 is a flow chart illustrating the steps of setting a function of a telephone answering system that enables automatic transmission of a greeting message according to the principles of the present invention.

FIG. 3 is a flow chart illustrating the steps of setting a function of a telephone answering system that enables automatic transmission of a greeting message according to the principles of the present invention. Briefly, the method of FIG. 3 includes the steps of determining whether a greeting message transmitting function is set in response to input of a function setting key, and setting or resetting a predetermined flag (i.e., FL2) based on whether the greeting message transmitting function is set.

Figure 4:
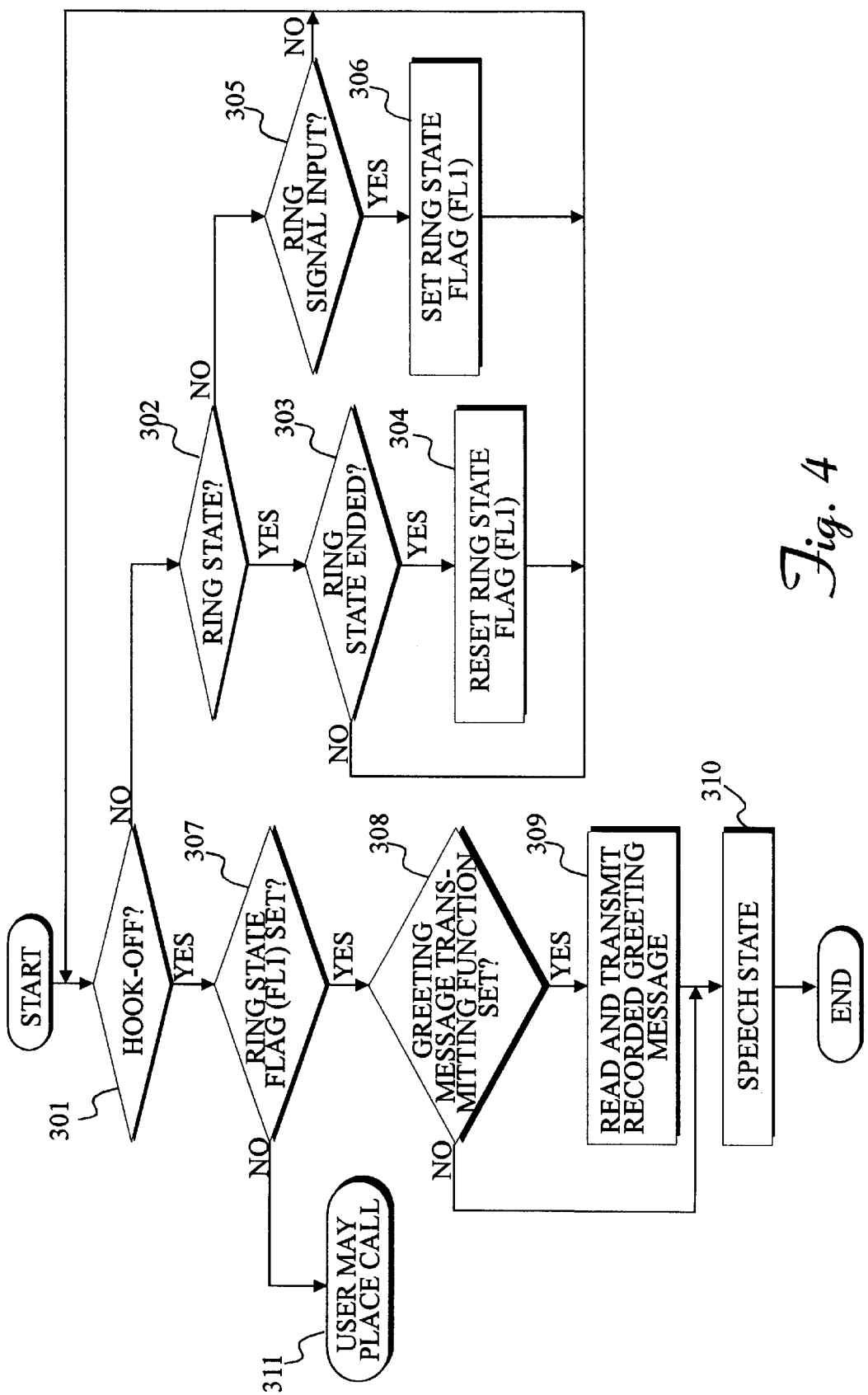
FIG. 4 is a flow chart illustrating the steps of transmitting a greeting message according to the principles of the present invention.

FIG. 4 is a flow chart illustrating the steps of transmitting a greeting message according to the principles of the present invention. Briefly, the method of FIG. 4 includes the steps of: detecting a hook-off state of the telephone, determining whether the greeting message transmission function is set after the hook-off state is detected, automatically transmitting a pre-recorded greeting message to a caller and then establishing a speech state between a user and the caller when the greeting message transmitting function is set, and establishing the speech state between the user and the caller without transmitting the pre-recorded greeting message when the greeting message transmitting function is not set.

Figure 5:
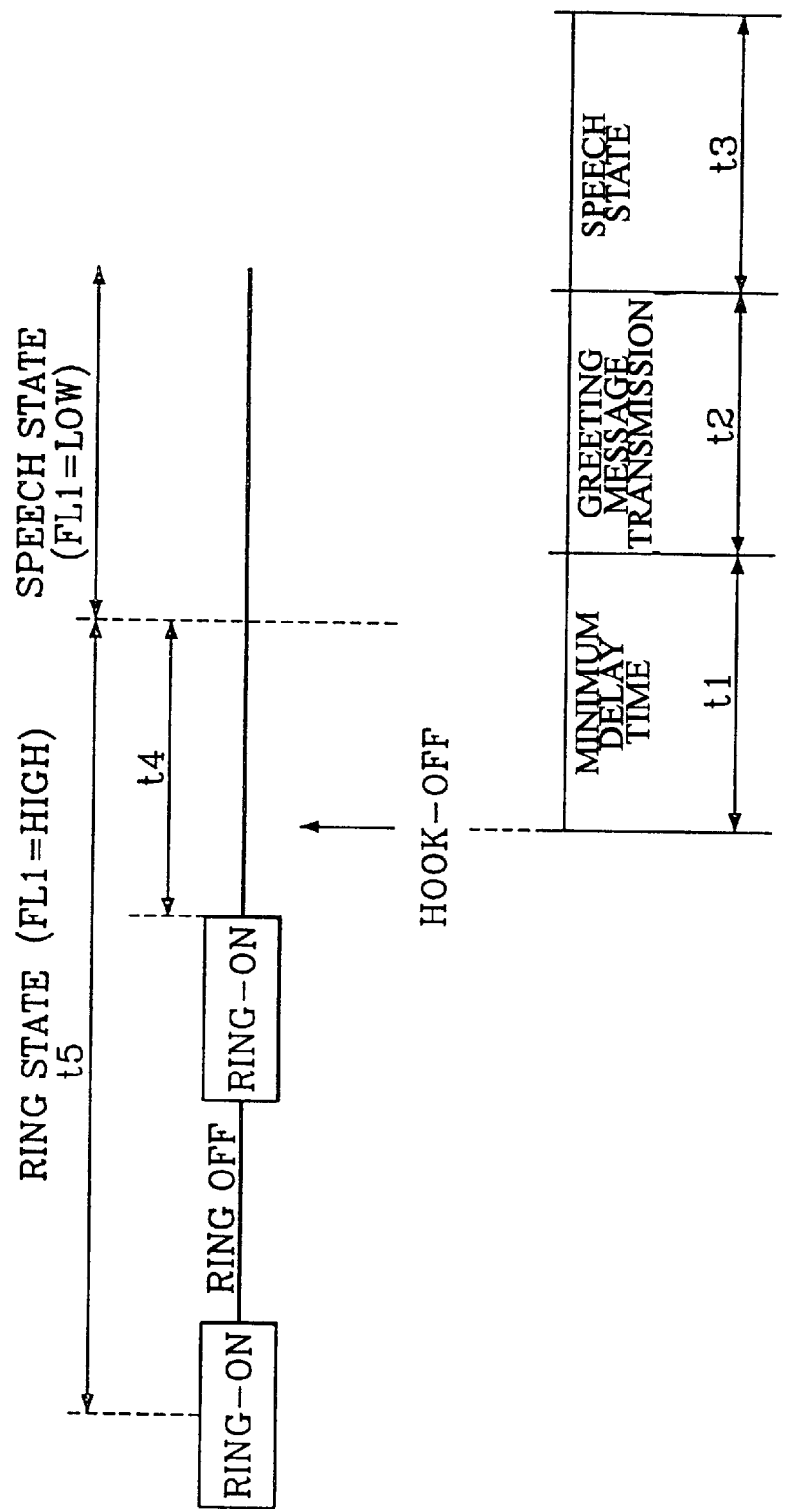
FIG. 5 is a timing diagram illustrating the stages of transmitting a greeting message according to the principles of the present invention.

FIG. 5 is a timing diagram illustrating the stages of transmitting a greeting message according to the principles of the present invention. In FIG. 5, a time interval t1 represents a minimum delay time before transmitting the pre-recorded greeting message after the hook-off state is detected. That is, time interval t1 represents the minimum amount of time required for connecting the speech path. A time interval t2 represents the period during which the pre-recorded greeting message is transmitted to a caller. Time interval t2 typically lasts for about 5 to 10 seconds. A time interval t3 represents a speech state during which the user and caller are actually speaking with one another. A time interval t4 represents a period during which a ring signal is not generated. A time interval t5 represents a telephone ring state during which generation of the ring signal is toggled in a conventional manner. As an example, FIG. 5 shows the hook-off state occurring during time interval t4.

Referring to FIGS. 1 through 5, a preferred embodiment of the present invention will now described.

In the practice of the present invention, the greeting message must first be registered. The greeting message is typically recorded in the user's voice and includes, for example, a recitation of the user's name and title. The operation of registering the greeting message is performed according to the steps shown in FIG. 2 as follows.

In step 101, central processing unit (CPU) 12 determines whether a recording key is input from key input unit 10, and proceeds to step 102 when the recording key is input. In step 102, central processing unit (CPU) 12 receives the oral greeting message from sound input unit 26, and records the greeting message in sound storage unit 22 after the message is processed in sound processing unit 20. Then, in step 103, central processing unit (CPU) 12 determines whether a stop key is input, and proceeds to step 104 when the stop key is input. In step 104, central processing unit (CPU) 12 stops the recording operation, and automatically plays the recorded greeting message back for the user to hear through sound output unit 28 by controlling sound processing unit 20 and switching unit 16.

After registering the greeting message as described above, the function of the telephone answering system that enables automatic transmission of the greeting message must be set. This operation will now be described with reference to FIG. 3.

In step 201, central processing unit (CPU) 12 first determines whether the function setting key is input from key input unit 10, and proceeds to step 202 when the function setting key is input. In step 202, central processing unit (CPU) 12 determines whether the greeting message transmitting function is set, and proceeds to step 203 when the function is set. According to an exemplary embodiment, this function is set in response to a predetermined key input from key input unit 10. In step 203, a function flag FL2 of the memory mounted in central processing unit (CPU) 12 is reset to "0", thereby setting the function and enabling its execution. When the greeting message transmitting function is not set in step 202, however, central processing unit (CPU) 12 proceeds to step 204 and sets the function flag FL2 of the memory mounted in central processing unit (CPU) 12 to "1". This prohibits execution of the greeting message transmitting function.

After the greeting message is registered, and the greeting message transmitting function is set, the present invention can provide automatic transmission of the greeting message according to the steps shown in FIG. 4. Referring to FIGS. 4 and 5, the operation of automatically transmitting the greeting message according to the principles of the present invention will now be described.

In step 301, central processing unit (CPU) 12 determines whether the telephone is in a hook-off state, and proceeds to step 302 when the hook-off state is not detected. In step 302, central processing unit (CPU) 12 determines whether the system is currently receiving an incoming ring signal. That is, central processing unit (CPU) 12 determines whether the telephone is in a ring state, as illustrated in interval t5 of FIG. 5. If the system is not currently receiving an incoming ring signal in step 302, central processing unit (CPU) 12 continues to detect whether a ring signal is input to the system in step 305. Central processing unit (CPU) 12 proceeds back to step 301 when a ring signal is not input, or proceeds to step 306 when a ring signal is input. In step 306, central processing unit (CPU) 12 sets a ring state flag FL1 to "1", and then returns to step 301.

Referring back to step 302, when the system is currently receiving an incoming ring signal, central processing unit (CPU) 12 proceeds to step 303 to determine whether the ring state has ended. If the ring state has not ended, step 301 is performed. On the other hand, if the ring state has ended, step 304 is performed. In step 304, central processing unit (CPU) 12 resets the ring state flag FL1 to "0", and then proceeds to step 301.

Referring back to step 301, when the hook-off state is detected, central processing unit (CPU) 12 proceeds to step 307 to determine whether the ring state flag FL1 is set to "1". If the ring state flag FL1 is not set to "1", but rather is reset to "0", the system is in a state where the user may place an outgoing call, in step 311. If, however, the ring state flag FL1 is set to "1" in step 307, central processing unit (CPU) 12 proceeds to step 308 and determines whether the greeting message transmitting finction is set. This is performed by detecting the state of function flag FL2. As indicated in the description of FIG. 3, the greeting message transmitting function is set, and can thereby be executed when the function flag FL2 is reset to "0". This designation, however, is simply a design choice and is not intended to limit the scope of the present invention. Accordingly, it will be intuitive to those skilled in the art that the greeting message transmitting function could alternatively be set by setting the fuinction flag FL2 to "1" in FIG. 3, rather than to "0".

When the greeting message transmitting function is set in step 308, central processing unit (CPU) 12 proceeds to step 309. In step 309, central processing unit (CPU) 12 controls sound processing unit 20, reads the greeting message recorded in sound storage unit 22, and transmits the greeting message to an outgoing telephone line through switching unit 16 and line interface and speech path unit 14. Then, in step 310, central processing unit (CPU) 12 controls switching unit 16 establishes a speech state so that the caller and user can engage in a conversation. If the greeting message transmitting function is not set in step 308, however, central processing unit (CPU) 12 simply establishes the speech state without automatically transmitting the greeting message to the caller.

As described above, an automatic telephone answering system constructed according to the principles of the present invention is able to automatically transmit a pre-recorded greeting message to a caller. Accordingly, the user of the system is relieved of the burden of continually having to orally recite a greeting message. Moreover, once the greeting message transmitting function is set, the message is automatically transmitted to a caller, thereby minimizing the number of key inputs required by the user.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for automatically transmitting a greeting message to a caller in response to a called party answering a telephone, said method comprising the steps of:

recording a greeting message in response to input of a recording key;

detecting a hook-off state initiated by the called party in response to an incoming call from the caller;

detecting a ring state;

determining, in response to detection of said hook-off state initiated by the called party and in response to said ring state, whether a greeting message transmitting function is set by checking a logic state exhibited by a function flag; and automatically transmitting said greeting message to the caller when said greeting message transmitting function is set.

2. The method as claimed in claim 1, further comprising a step of stopping said recording of said greeting message in response to input of a stop key.

3. The method as claimed in claim 2, further comprising a step of automatically playing said greeting message back after said recording in response to the input of said stop key.

4. The method as claimed in claim 2, further comprising a step of setting said greeting message transmitting function by providing a predetermined key input after said greeting message is recorded.

5. The method as claimed in claim 1, wherein said greeting message is an oral message indicating a user's name and title.

6. The method as claimed in claim 3, wherein said greeting message is an oral message indicating a user's name and title.

7. The method as claimed in claim 1, further comprising the steps, when the hook-off state is not detected, of determining a ring state and resetting a ring state flag when said ring state is in progress.

8. The method as claimed in claim 1, further comprising the steps, when said hook-off state is not detected, of waiting for a ring signal input and, once the ring signal input occurs, setting a ring state flag.

9. A method for automatically transmitting a greeting message to a caller in response to a called party answering a telephone, said method comprising the steps of:

recording a greeting message in response to input of a recording key by a user;

detecting a hook-off state initiated by the called party in response to an incoming call from the caller;

detecting a ring state;

determining, in response to detection of said hook-off state initiated be the called party and in response to said ring state, whether a greeting message transmitting function is set by checking a logic state exhibited by a function flag;

automatically transmitting said greeting message to the caller when said greeting message transmitting function is set, and then establishing a speech state to enable a conversation between the caller and the user; and establishing said speech state without transmitting said greeting message to the caller when said greeting message transmitting function is not set.

10. The method as claimed in claim 9, further comprising a step of stopping said recording of said greeting message in response to input of a stop key.

11. The method as claimed in claim 10, further comprising a step of automatically playing said greeting message back after said recording in response to the input of said stop key.

12. The method as claimed in claim 10, further comprising a step of setting said greeting message transmitting function by providing a predetermined key input after said greeting message is recorded.

13. The method as claimed in claim 9, wherein said greeting message is an oral message indicating the user's name and title.

14. The method as claimed in claim 11, wherein said greeting message is an oral message indicating the user's name and title.

15. The method as claimed in claim 9, further comprising the steps, when the hook-off state is not detected, of determining a ring state and resetting a ring state flag when said ring state is in progress.

16. The method as claimed in claim 9, further comprising the steps, when said hook-off state is not detected, of waiting for a ring signal input and, once the ring signal input occurs, setting a ring state flag.

17. A telephone answering system for automatically transmitting a greeting message to a caller in response to a called party answering a telephone, comprising:

a key input unit having a plurality of input keys;

voice recording means for recording a greeting message in response to input of a recording key on said key input unit by a user; and control means for controlling operation of said system;

wherein said control means detects a hook-off state initiated by the called party in response to an incoming call from the caller, detects a ring state, responds to detection of said hook-off state initiated by the caller and to said ring state by determining whether a greeting message transmitting function is set by checking a logic state exhibited by a function flag in response to detection of said hook-off state, enables automatic transmission of said greeting message from said voice recording means to the caller when said greeting message transmitting function is set, establishes a speech state to enable a conversation between the caller and the user, and establishes said speech state without transmitting said greeting message to the caller when said greeting message transmitting function is not set.

18. The telephone answering system as claimed in claim 17, further comprising said control means stopping the recording of said greeting message in response to input of a stop key on said key input unit by the user.

19. The telephone answering system as claimed in claim 18, further comprising said control means enabling automatic playback of said greeting message after the recording of said greeting message in response to the input of said stop key.

20. The telephone answering system as claimed in claim 17, further comprising said control means setting said greeting message transmitting function in response to a predetermined key input provided from said key input unit after said greeting message is recorded.

21. The telephone answering system as claimed in claim 17, wherein said greeting message is an oral message indicating the user's name and title.

22. The telephone answering system as claimed in claim 17, wherein, if said hook-off state is not detected, said control means awaits the end of said ring state, and then resets a ring state flag.

23. The telephone answering system as claimed in claim 17, wherein, if said hook-off state is not detected, said control means awaits a ring signal input, and then sets a ring state flag once said ring signal input is detected.

* * * * *